United States Patent
Karl

(12) 
(10) Patent No.: US 7,217,405 B2
(45) Date of Patent: May 15, 2007

(54) METHOD FOR PRODUCING POST-TREATED CARBON BLACK

(75) Inventor: Alfons Karl, Gründau (DE)

(73) Assignee: Degussa AG, Düsseldorf (DE)

( * ) Notice: Subject to any disclaimer, the term of this patent is extended or adjusted under 35 U.S.C. 154(b) by 573 days.

(21) Appl. No.: 10/373,171

(22) Filed: Feb. 24, 2003

(65) Prior Publication Data

US 2003/0180210 A1    Sep. 25, 2003

(30) Foreign Application Priority Data

Mar. 14, 2002 (DE) .............................. 102 11 098

(51) Int. Cl.
*C01D 3/00* (2006.01)
(52) U.S. Cl. .................................. 423/449.1
(58) Field of Classification Search ............. 423/449.1, 423/449.5
See application file for complete search history.

(56) References Cited

U.S. PATENT DOCUMENTS

| | | | |
|---|---|---|---|
| 3,245,820 A | | 4/1966 | Melore et al. |
| 3,247,003 A | * | 4/1966 | Pollock ....................... 106/478 |
| 3,279,935 A | * | 10/1966 | Daniell et al. .............. 106/478 |
| 3,364,048 A | | 1/1968 | May et al. |
| 3,495,999 A | | 2/1970 | Hagopian |
| 3,565,657 A | | 2/1971 | Dannenberg et al. |
| 4,150,101 A | * | 4/1979 | Schmidt et al. ............. 423/338 |
| 4,221,772 A | * | 9/1980 | Eisenmenger et al. .. 423/445 R |
| 4,755,358 A | | 7/1988 | Voll et al. |

FOREIGN PATENT DOCUMENTS

| | | |
|---|---|---|
| DE | 195 21 565 A1 | 1/1997 |
| DE | 196 13 796 A1 | 10/1997 |
| EP | 0 969 052 A1 | 1/2000 |
| GB | 695492 | 8/1953 |
| WO | WO 96/37547 | 11/1996 |
| WO | WO 98/42778 | 10/1998 |
| WO | WO 98/45361 | 10/1998 |

OTHER PUBLICATIONS

European Search Report, dated Jul. 24, 2003, issued by the European Patent Office for European Patent Application No. 03003641.2 (4 pages).

* cited by examiner

*Primary Examiner*—Edward M. Johnson
(74) *Attorney, Agent, or Firm*—Smith, Gambrell & Russell, LLP

(57) ABSTRACT

The invention concerns a method for producing post-treated carbon black, where the carbon black is fluidized in the fluidized bed while adding fluidizing agents and brought into contact with a post-treatment agent.

9 Claims, No Drawings

METHOD FOR PRODUCING POST-TREATED CARBON BLACK

The invention concerns a method for producing post-treated carbon black.

Carbon black is chiefly used as black pigment in paints and printing inks because of its excellent properties. There is a large selection of pigment blacks with various properties available. Various methods are used to produce pigment black. The most common is production by oxidative pyrolysis of carbon-containing carbon black raw materials. Here the carbon black raw materials are incompletely combusted at high temperatures in the present of oxygen. This class of carbon black production processes includes, for example, the furnace black process, the gas black process and the flame black process. Chiefly polynuclear aromatic carbon black oils are used as carbon-containing raw materials for carbon blacks.

The surface chemistry of carbon blacks is dependent on the production process that is selected. With the furnace black process, carbon black formation takes place in a highly reducing atmosphere, while with the gas black process, atmospheric oxygen has free access to the carbon black formation zone. Accordingly, the gas blacks have a considerably higher content of surface oxides immediately after production than do furnace blacks.

Pigment blacks can be oxidatively post-treated in order to increase their content of volatile components. Nitric acid, nitrogen dioxide and, to a lesser extent, even ozone are used as oxidation agents. The oxidation process in this case is decisively dependent on the carbon black production process. Oxidation of furnace blacks with nitric acid is known from U.S. Pat. No. 3,565,657.

Oxidizing furnace blacks by ozone treatment is also known (U.S. Pat. Nos. 3,245,820, 3,364,048, 3,495,999). Disadvantages of the known processes are the poor mass and energy transfer, poor homogeneity of the product, equipment parts that are mechanically in motion, and a discontinuous mode of operation.

The task of the invention is to make available a method in which optimum mass and energy transfer takes place, the product has very good homogeneity, and the process can be operated continuously.

The object of the invention is a method for producing post-treated carbon black, characterized by the fact that the carbon black is fluidized in a fluidized bed while adding fluidizing agents and brought into contact with a post-treatment agent.

As carbon black, one may use furnace black, gas black, channel black, flame black, thermal black, acetylene black, plasma black, inversion blacks which are known from DE 195 21 565, Si-containing blacks which are known from WO 98/45361 or DE 19613796, or metal-containing blacks which are known from WO 98/42778, arc black and blacks that are by-products of chemical production processes. The carbon black can be modified by the presented reactions.

Carbon blacks that are used as reinforcing filler in rubber mixtures can be used.

Color blacks can be used.

Other blacks can be: conductive black, carbon black for UV stabilization, carbon black as filler in systems other than rubber, for example, in bitumen and plastic, carbon black as reducing agent in metallurgy.

Preferably a furnace black can be used as the carbon black. Normally and more highly structurized furnace blacks with a DBP value greater than 70 mL/100 g, preferably greater than 90 mL/100 g, are especially preferably used.

Carbon black mixtures can also be used as the carbon black.

Pyrogenic silicic acid, hydrophobized pyrogenic silicic acid, pyrogenic mixed oxide or pyrogenic aluminum oxide can be used as fluidizing agents.

As pyrogenic silicic acid one can use Aerosil 90, Aerosil 200, Aerosil OX 50 or Aerosil 300, as hydrophobized pyrogenic silicic acid one may use Aerosil R 8200, Aerosil R 202 or Aerosil R 972, as pyrogenic mixed oxides one can use Aerosil MOX 80 or Aerosil MOX 170, and as pyrogenic aluminum oxide one can use Aluminium oxide C (Degussa AG).

The fluidizing agent can be used in amounts of 0.1–10 wt %, preferably 0.5–2 wt %, with respect to the carbon black.

The fluidizing agent can be mixed with the carbon black in the fluidized bed or introduced into the fluidized bed in premixed form.

The post-treatment agent can be an oxidation agent or extraction agent.

Ozone or $NO_2$ can be used as oxidation agents.

Air, steam or air/steam mixtures can be used as extraction agents, for example, in order to reduce the extract content of carbon blacks.

The post-treatment agent can be sprayed into the fluidized bed. The post-treatment can be carried out at temperatures from 10° C. to 1200° C.

If ozone is used as post-treatment agent, the temperature can preferably be 10° C. to 100° C.

If $NO_2$ is used as post-treatment agent, the temperature can preferably be 100–300° C.

If air/steam is used as post-treatment agent, the temperature can preferably be 300° C. to 600° C.

If steam is used as post-treatment agent, the temperature can preferably be 800–1100° C. The residence time in the fluidized bed can amount to 0.1–10 h, preferably 1–5 h. The amount of post-treatment agent can be from 1 mg/g of carbon black up to 10 g/g of carbon black. The post-treatment agent can be introduced into the fluidized bed in preheated form.

The fluidized bed can be operated continuously.

The carbon black produced with the method in accordance with the invention can then be blown with air or nitrogen in order to remove excess post-treatment agent. The blowing can take place in the fluidized bed or outside the fluidized bed. The blowing times can be from 10 min to 10 h, preferably 30 min to 2 h. The blowing temperature can be 20° to 300° C., preferably 50° to 200° C.

The post-treated carbon blacks produced by the method in accordance with the invention can be used as pigment blacks.

The method in accordance with the invention has the advantage that carbon blacks that are difficult to fluidize, for example, furnace blacks, can be readily fluidized through the addition of fluidizing agents. Other advantages of the method in accordance with the invention over the known stirred fixed bed are the optimum mass and energy transfer, the very good homogeneity of the post-treated carbon black, and operation in a reactor, which can be operated continuously and without mechanically moving parts.

EXAMPLES

The carbon blacks listed in Table 1 are used for the examples.

TABLE 1

| Carbon black | | Printex 30 | Printex 60 | Printex 90 | Printex 3 |
|---|---|---|---|---|---|
| Iodine No. (ASTM 1510) | mg/g | 87 | 127 | 350 | 96 |
| CTAB (ASTM 3765) | m²/g | 78 | 102 | 245 | 83 |
| DBP (ASTM 2414) | mL/100 g | 108 | 109 | 95 | 133 |
| Oil absorption (DIN ENISO 787-5) | g/100 g | 590 | 600 | 750 | 710 |
| Volatiles 950° C. (DIN 53552) | wt % | 2.7 | 2.3 | 2.5 | 2.0 |
| pH (DIN ENISO 787-9) | | 9.6 | 9.5 | 9.2 | 10.0 |

TABLE 1-continued

| Carbon black | | Printex 30 | Printex 60 | Printex 90 | Printex 3 |
|---|---|---|---|---|---|
| Bulk weight (DIN 53600) | g/L | 155 | 200 | 89 | 61 |

Printex 30, Printex 60, Printex 90 and Printex 3 are pigment blacks made by Degussa AG.

The pure carbon blacks can be present in the fluidized bed in a nonfluidized form. The carbon blacks can remain unfluidized until Aerosil R 812 S is added. Aerosil R 812 S is mixed into the carbon black in an amount of 1 wt %.

Example 1

The oxidation of Printex 30 with ozone and $NO_2$ is carried out in two fluidized bed devices of different sizes (diameter 80 mm and 200 mm). With amounts of air as are used for oxidation of gas blacks, fluidized bed conditions are achieved through the addition of Aerosil. By varying the reaction time and the amount of carbon black used, the different contents of volatiles are established, where a volatiles content of 5.0 wt % does not represent the upper limit. The ozone-oxidized carbon blacks clearly have better oil absorption than the $NO_2$-oxidized carbon blacks for the same degree of oxidation. The test parameters and properties of the carbon blacks are listed in Table 2.

TABLE 2

| | | Printex 30 $NO_2$-oxidized | Printex 30 $NO_2$-oxidized | Printex 30 Ozone-oxidized | Printex 30 Ozone-oxidized |
|---|---|---|---|---|---|
| Amount of carbon black | g | 2500 | 2500 | 2500 | 2500 |
| Set temperature | ° C. | 220 | 220 | 20 | 20 |
| Amount of air | Nl/h | 1500 | 1500 | 1500 | 1500 |
| Amount of $NO_2$ | Nl/h | 70 | 70 | — | — |
| $NO_2$ concentration | Vol. % | 4.7 | 4.7 | — | — |
| Ozone concentration | g/Nm³ | — | — | 21 | 21 |
| Amount of ozone | g/h | — | — | 31.5 | 31.5 |
| Reaction time | h | 0.5 | 2.0 | 2.0 | 6.0 |
| Blowing time | h | 1 | 1 | 1 | 1 |
| Iodine number | mg/g | 77 | 82 | 54 | 43 |
| CTAB | m²/g | 80 | 88 | 86 | 94 |
| DBP | mL/100 g | 108 | 106 | 111 | 111 |
| Oil absorption | g/100 g | 540 | 470 | 340 | 370 |
| Volatiles | wt % | 2.7 | 5.3 | 3.1 | 4.5 |
| pH | | | 4.4 | 3.6 | 3.4 | 2.7 |
| Bulk weight | g/L | 157 | 277 | 168 | 140 |

Example 2

The oxidation of Printex 60 with ozone is carried out in the 80-mm diameter fluidized bed apparatus. By varying the reaction time and the amount of carbon black that is used, different volatiles contents are established. The effect of the oxone oxidation on the oil absorption, which is clearly reduced even at low degrees of oxidation, is especially clear. The test parameters and carbon black properties are listed in Table 3.

TABLE 3

| | | Printex 60 Ozone-oxidized | Printex 60 Ozone-oxidized | Printex 60 Ozone-oxidized |
|---|---|---|---|---|
| Amount of carbon black | g | 600 | 500 | 400 |
| Set temperature | °C. | 20 | 20 | 20 |
| Amount of air | Nl/H | 500 | 500 | 750 |
| Ozone concentration | g/Nm$^3$ | 21.0 | 21.0 | 15.6 |
| Amount of ozone | g/h | 10.5 | 10.5 | 11.7 |
| Reaction time | h | 4.0 | 4.0 | 3.0 |
| Blowing time | h | 1 | 1 | 1 |
| Iodine number | mg/g | 64 | 50 | 37 |
| CTAB | m$^2$/g | 113 | 127 | 129 |
| DBP | mL/100 g | 115 | 113 | 114 |
| Oil absorption | g/100 g | 320 | 234 | 210 |
| Volatiles | wt % | 3.9 | 5.7 | 6.1 |
| pH | | 2.8 | 2.7 | 2.6 |
| Bulk weight | g/L | 204 | 258 | 244 |

Example 3

The oxidation of Printex 90 with ozone is carried out in two fluidized bed devices of different sizes (diameter 80 mm and 200 mm). The different volatiles contents are set by varying the reaction time, where a volatiles content of 10 wt % is possible. The test parameters and carbon black properties are listed in Table 4.

TABLE 4

| | | Printex 90 Ozone-oxidized | Printex 90 Ozone-oxidized | Printex 90 Ozone-oxidized |
|---|---|---|---|---|
| Amount of carbon black | g | 1000 | 1000 | 1000 |
| Set temperature | °C. | 20 | 20 | 20 |
| Amount of air | Nl/H | 1000 | 1250 | 1000 |
| Ozone concentration | g/Nm$^3$ | 31.6 | 36.0 | 36.0 |
| Amount of ozone | g/h | 31.6 | 15.0 | 36.0 |
| Reaction time | h | 3.0 | 2.5 | 6.0 |
| Blowing time | h | 1 | 1 | 1 |
| Iodine number | mg/g | 238 | 215 | 147 |
| CTAB | m$^2$/g | 283 | 271 | 300 |
| DBP | mL/100 g | | | 83 |
| Oil absorption | g/100 g | 580 | 420 | 320 |
| Volatiles | wt % | 5.9 | 7.4 | 9.8 |
| pH | | 3.1 | 2.9 | 2.3 |
| Bulk weight | g/L | 102 | | 98 |

Example 4

The oxidation of Printex 3 with ozone is carried out in two fluidized bed devices of different sizes (diameter 80 mm and 200 mm). Carbon blacks with volatiles contents from 3.1 to 11.5 wt % are produced. The blowing time is 1 h, in order to remove adhering ozone or labile peroxides on the carbon black surface. The carbon blacks are then dry pearled. The test parameters and carbon black properties are listed in Table 5.

TABLE 5

| | | Printex 3 Ozone-oxidized | Printex 3 Ozone-oxidized | Printex 3 Ozone-oxidized | Printex 3 Ozone-oxidized | Printex 3 Ozone-oxidized |
|---|---|---|---|---|---|---|
| Amount of carbon black | g | 1000 | 1000 | 1500 | 1500 | 1500 |
| Set temperature | °C. | 20 | 20 | 20 | 20 | 20 |
| Amount of air | Nl/h | 1250 | 650 | 1250 | 1500 | 1500 |
| Ozone concentration | g/Nm$^3$ | 30.6 | 23.5 | 36.3 | 32.9 | 32.7 |
| Amount of ozone | g/h | 38.3 | 15.3 | 45.4 | 49.4 | 49.1 |
| Reaction time | h | 3.0 | 4.0 | 4.0 | 8.0 | 24.0 |
| Blowing time | h | 1 | 1 | 1 | 1 | 1 |
| Iodine number | mg/g | 79 | 52 | 63 | 24 | 22 |
| CTAB | m$^2$/g | 98 | 104 | 122 | 142 | 175 |
| DBP | mL/100 g | 132 | 134 | 136 | 137 | 138 |
| Oil absorption | g/100 g | 400 | 310 | 350 | 190 | 180 |
| Volatiles | wt % | 3.1 | 3.7 | 5.5 | 7.7 | 11.5 |
| pH | | 4.1 | 3.2 | 3.0 | 2.5 | 2.3 |
| Bulk weight | g/L | 256 | 200 | 212 | 276 | 222 |

The invention claimed is:

1. A method for producing post-treated carbon black, comprising fluidizing the carbon black in a fluidized bed by adding a fluidizing agent and bringing the carbon black into contact with a post-treatment agent, and wherein the fluidizing agent is a member selected from the group consisting of pyrogenic silicic acid, hydrophobized pyrogenic silicic acid, pyrogenic mixed oxide and pyrogenic aluminum oxide.

2. A method for producing post-treated carbon black as in claim 1, wherein the carbon black is a member selected from the group consisting of furnace black, gas black, channel black, flame black, thermal black, acetylene black, plasma black, inversion blacks, Si-containing blacks, metal-containing blacks, arc black and blacks that are by-products of chemical production processes.

3. A method for producing post-treated black as in claim 1, wherein the carbon black is a furnace black with a DBP value greater than 70 mL/100 g.

4. A method for producing post-treated carbon black as in claim 1, wherein the fluidizing agent is used in amounts of 0.1–10 wt % with respect to the carbon black.

5. A method for producing post-treated carbon black as in claim 1, wherein the post-treatment agent is an oxidation agent or extraction agent.

6. A method for producing post-treated carbon black as in claim 5, wherein the oxidation agent is ozone or $NO_2$.

7. A method for producing post-treated carbon black as in claim 5, wherein the extraction agent is air or an air/steam mixture.

8. A method for producing post-treated carbon black as in claim 1, wherein the fluidized bed is operated continuously.

9. A method for producing post-treated carbon black as in claim 1, further comprising blowing out excess post-treatment agent with air or nitrogen.

* * * * *